(12) United States Patent
Matsumura

(10) Patent No.: US 12,428,542 B2
(45) Date of Patent: Sep. 30, 2025

(54) CHLORINATED VINYL CHLORIDE RESIN COMPOSITION AND CHLORINATED VINYL CHLORIDE RESIN MOLDED BODY

(71) Applicant: SEKISUI CHEMICAL CO., LTD., Osaka (JP)

(72) Inventor: Kenichi Matsumura, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 752 days.

(21) Appl. No.: 17/636,201

(22) PCT Filed: Aug. 28, 2020

(86) PCT No.: PCT/JP2020/032682
§ 371 (c)(1),
(2) Date: Feb. 17, 2022

(87) PCT Pub. No.: WO2021/039993
PCT Pub. Date: Mar. 4, 2021

(65) Prior Publication Data
US 2022/0282065 A1   Sep. 8, 2022

(30) Foreign Application Priority Data

Aug. 30, 2019   (JP) ................. 2019-158984

(51) Int. Cl.
C08K 5/37        (2006.01)
C08K 5/57        (2006.01)
C08K 5/58        (2006.01)
C08L 27/24       (2006.01)

(52) U.S. Cl.
CPC .............. *C08K 5/37* (2013.01); *C08K 5/57* (2013.01); *C08K 5/58* (2013.01); *C08L 27/24* (2013.01); *C08L 2201/08* (2013.01)

(58) Field of Classification Search
CPC .... C08K 5/37; C08K 5/58; C08K 5/57; C08L 27/24; C08L 2201/08
See application file for complete search history.

(56) References Cited

U.S. PATENT DOCUMENTS

| 3,450,668 A | 6/1969 | Kawakami et al. |
| 4,256,618 A | 3/1981 | Brecker et al. |
| 5,587,419 A * | 12/1996 | Lawson .................. C08L 27/24 525/239 |

FOREIGN PATENT DOCUMENTS

| JP | 51-20250 | 2/1976 |
| JP | 55-99944 | 7/1980 |
| JP | 63-248838 | 10/1988 |
| JP | 2-173146 | 7/1990 |
| JP | 2-269756 | 11/1990 |
| JP | 3-54245 | 3/1991 |
| JP | 4-53859 | 2/1992 |
| JP | 4-198349 | 7/1992 |
| JP | 2515924 B2 * | 7/1996 |
| JP | 2004-107531 | 4/2004 |
| JP | 2006-199801 | 8/2006 |
| JP | 2010-248507 | 11/2010 |
| JP | 2015-13952 | 1/2015 |

OTHER PUBLICATIONS

Machine English translation of JP 2515924, Daigen et al., Jul. 10, 1996.*
Huijiu Zhou, ed., Concise Explanation of "Dictionary of New Materials", Shanghai Scientific and Technological Literature Press, Dec. 1996, pp. 353-354.
International Search Report issued Nov. 10, 2020 in International (PCT) Application No. PCT/JP2020/032682.

* cited by examiner

*Primary Examiner* — Patrick D Niland
(74) *Attorney, Agent, or Firm* — Wenderoth, Lind & Ponack, L.L.P.

(57) ABSTRACT

The present invention provides a chlorinated polyvinyl chloride resin composition capable of providing a molded article that is excellent in discoloration resistance and corrosion resistance and is not likely to cause environmental pollution as the amount of metal leached therefrom is small, and a chlorinated polyvinyl chloride resin molded article. The present invention relates to a chlorinated polyvinyl chloride resin composition containing: a chlorinated polyvinyl chloride resin; a thermal stabilizer; and at least one thioglycolic acid compound selected from the group consisting of thioglycolic acid and thioglycolic acid esters.

17 Claims, No Drawings

CHLORINATED VINYL CHLORIDE RESIN COMPOSITION AND CHLORINATED VINYL CHLORIDE RESIN MOLDED BODY

TECHNICAL FIELD

The present invention relates to a chlorinated polyvinyl chloride resin composition and a chlorinated polyvinyl chloride resin molded article.

BACKGROUND ART

Polyvinyl chlorides (hereafter, referred to as PVCs) have excellent mechanical strength, weather resistance, and chemical resistance, and thus have been used in various fields. PVCs, however, have poor heat resistance. This has led to the development of chlorinated polyvinyl chloride resins (hereafter, referred to as CPVCs), which are PVCs chlorinated to have improved heat resistance. PVCs have a low heat distortion temperature and the upper limit of the usable temperature thereof is at around 60° C. to 70° C., which does not allow the use of PVCs with hot water. In contrast, CPVCs have a higher heat distortion temperature than PVCs by 20° C. to 40° C. and therefore are usable with hot water. Such CPVCs are suitably used in heat-resistant joints, heat-resistant pipes, heat-resistant bulbs, heat-resistant plates, or the like.

Addition of a thermal stabilizer to CPVC prior to melt-molding is a common technique for improving various performances such as thermal stability and discoloration resistance.

For example, Patent Literature 1 discloses a chlorinated polyvinyl chloride resin composition prepared by adding predetermined amounts of chlorinated polyethylene, an organotin thermal stabilizer, and an inorganic stabilizer to a chlorinated polyvinyl chloride resin for the purpose of imparting thermal stability, heat moldability, and like properties.

Patent Literature 2 discloses a halogen-containing polymer composition prepared by adding a salt of a polymeric polyacid in a predetermined amount together with an alkyl tin stabilizer for the purpose of improving the performance of the alkyl tin compound.

CITATION LIST

Patent Literature

Patent Literature 1: JP 2006-199801 A
Patent Literature 2: JP 2010-248507 A

SUMMARY OF INVENTION

Technical Problem

Even when CPVC is blended with a thermal stabilizer, however, it is difficult to prevent generation of hydrogen chloride caused by pyrolysis or discoloration of the resulting molded article due to a molding process under high-temperature, high-pressure conditions.

In particular, metallic parts such as the inside of a molding machine (cylinder, screw) or a die are corroded by hydrogen chloride generated during the molding, which disadvantageously leads to a demand for use of more expensive corrosion resistant materials or maintenance treatment such as polishing which needs a great deal of time and man-hours.

Addition of a large amount of thermal stabilizer containing tin or the like is employed to avoid such disadvantages. However, when the resulting molded pipe is used to run drinking water therethrough, the amount of tin metal leached into the water increases in proportion to the amount of the thermal stabilizer added. It is difficult to balance such leaching and the disadvantages mentioned above.

Solution to Problem

The present invention relates to a chlorinated polyvinyl chloride resin composition containing: a chlorinated polyvinyl chloride resin; a thermal stabilizer; and at least one thioglycolic acid compound selected from the group consisting of thioglycolic acid and thioglycolic acid esters.

The present invention is specifically described in the following.

The present inventors found out that addition of a thermal stabilizer and at least one thioglycolic acid compound selected from the group consisting of thioglycolic acid and thioglycolic acid esters to a chlorinated polyvinyl chloride resin composition containing a chlorinated polyvinyl chloride resin enables production of a molded article less susceptible to discoloration over time (discoloration resistance).

They also found out that the addition can reduce or prevent corrosion of the inside of a molding machine or a die (corrosion resistance) and eliminate the need for addition of an excessive amount of thermal stabilizers, enabling production of a molded article that is not likely to cause environmental pollution as the amount of metal leached therefrom is reduced. Thus, the present invention was completed.

The chlorinated polyvinyl chloride resin composition of the present invention contains a chlorinated polyvinyl chloride resin (hereafter, also referred to as "CPVC").

The chlorinated polyvinyl chloride resin contains structural units (a) to (c) represented by the following formulas (a) to (c). The proportion of the structural unit (a) is 5 to 90 mol %, the proportion of the structural unit (b) is 5 to 40 mol %, and the proportion of the structural unit (c) is 5 to 55 mol %, based on the total number of moles of the structural units (a), (b), and (c). Such a chlorinated polyvinyl chloride resin can provide a molded article that is excellent in discoloration resistance and corrosion resistance and is not likely to cause environmental pollution as the amount of metal leached therefrom is small.

[Chem. 1]

$$—CH_2—CHCl— \quad (a)$$

$$—CH_2—CCl_2— \quad (b)$$

$$—CHCl—CHCl— \quad (c)$$

The molar ratios of the structural units (a), (b), and (c) in the chlorinated polyvinyl chloride resin reflect the site to which chlorine is introduced at the time of chlorination of the polyvinyl chloride (PVC). As chlorination proceeds, the proportion of the structural unit (a) decreases, while the proportions of the structural units (b) and (c) increase.

In contrast, in the present invention, setting the molar ratios of the structural units (a), (b), and (c) within the above range enables production of a molded article that is excellent in discoloration resistance and corrosion resistance and is not likely to cause environmental pollution as the amount of metal leached therefrom is small.

In the chlorinated polyvinyl chloride resin, the proportion of the structural unit (a) is more preferably 30 to 90 mol %, still more preferably 35 to 60 mol %, based on the total number of moles of the structural units (a), (b), and (c). The proportion of the structural unit (b) is more preferably 5 to 30 mol %, still more preferably 15 to 25 mol %, based on the total number of moles of the structural units (a), (b), and (c). The proportion of the structural unit (c) is more preferably 5 to 50 mol %, still more preferably 25 to 45 mol %, based on the total number of moles of the structural units (a), (b), and (c).

The molar ratios of the structural units (a), (b), and (c) in the chlorinated polyvinyl chloride resin of the present invention can be measured by molecular structure analysis using NMR. NMR analysis can be performed in accordance with the method described in R. A. Komoroski, R. G. Parker, J. P. Shocker, Macromolecules, 1985, 18, 1257-1265.

In the chlorinated polyvinyl chloride resin, the amount of added chlorine is preferably 6.3 to 15.2% by mass.

When the amount of added chlorine is 6.3% by mass or more, the molded article has sufficient heat distortion resistance. When the amount of added chlorine is 15.2% by mass or less, moldability is improved.

The amount of added chlorine is more preferably 9.3% by mass or more, and more preferably 12.3% by mass or less.

To determine the amount of added chlorine in the chlorinated polyvinyl chloride resin, the chlorine content of the resin is first measured by the method specified in JIS K 7229. The obtained chlorine content is subtracted from the chlorine content (56.8% by mass) of a polyvinyl chloride, thereby determining the amount of added chlorine.

The degree of polymerization of the chlorinated polyvinyl chloride resin is not limited, and is preferably 400 to 2,000, more preferably 500 to 1,000.

When the degree of polymerization is within the above range, fluidity in molding and the strength of the molded article can be both achieved.

The chlorinated polyvinyl chloride resin may be produced by, for example, a method including preparing a suspension in a reaction vessel by suspending a polyvinyl chloride in an aqueous medium, introducing chlorine into the reaction vessel, and heating the suspension to chlorinate the polyvinyl chloride.

The reaction vessel used may be a commonly used vessel such as a glass-lined stainless steel reaction vessel or titanium reaction vessel, for example.

The method of preparing the suspension of the polyvinyl chloride in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be brown into the reaction vessel, as required. It is preferred to use chlorine after purging 5 to 10% by mass of chlorine from the cylinder.

While the gauge pressure in the reaction vessel is not limited, it is preferably from 0 to 2 MPa, because the higher the chlorine pressure is, the more readily the chlorine will penetrate into the PVC particles.

The method of chlorinating the PVC in the suspended state is not limited. Examples of the chlorination method include a method in which the excitation of bonding of the PVC and chlorine is brought about by thermal energy to accelerate the chlorination (hereinafter referred to as thermal chlorination); and a method in which light energy such as ultraviolet light or LED is applied to accelerate the chlorination by photoreaction (hereinafter referred to as photochlorination). The heating method in the chlorination by thermal energy is not limited, and for example, heating with an external jacket from the reactor wall is effective. The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

Preferred among the above chlorination methods is a thermal chlorination method involving no ultraviolet irradiation. Preferred is a method in which the excitation of bonding of the polyvinyl chloride and chlorine is brought about by heat alone or by heat and hydrogen peroxide to accelerate the chlorination reaction.

In the case of the chlorination reaction by light energy, the amount of light energy needed to chlorinate the PVC is greatly affected by the distance between the PVC and the light source. Thus, the amount of received energy is different inside and on the surface of the PVC particles, so that chlorination does not occur uniformly. As a result, a CPVC with reduced uniformity is obtained. In contrast, with the method of chlorination by heat without ultraviolet irradiation, a more uniform chlorination reaction occurs to produce a CPVC with increased uniformity.

The chlorination by heat alone is preferably performed at a temperature of 40° C. to 120° C. When the temperature is excessively low, the rate of chlorination will decrease. When the temperature is excessively high, dehydrochlorination reaction will occur along with the chlorination reaction, which causes discoloration of the resulting CPVC. The heating temperature is more preferably 50° C. to 110° C. The heating method is not limited, and heating may be performed with an external jacket from the reaction vessel wall, for example.

In the chlorinated polyvinyl chloride resin composition of the present invention, the amount of the CPVC is preferably 65 to 96% by mass, more preferably 70 to 93% by mass. Containing the CPVC within this range, the chlorinated polyvinyl chloride resin composition of the present invention can provide a molded article having both heat distortion resistance and impact resistance and being excellent in surface smoothness.

The chlorinated polyvinyl chloride resin composition of the present invention contains a thermal stabilizer. In the present invention, the thermal stabilizer is preferably one containing tin. In particular, an organotin stabilizer is preferred. The stabilizer containing a calcium alkylcarboxylate and a zinc compound may also be used.

Examples of the organotin stabilizer include alkyltins (e.g., methyltin, butyltin, octyltin), preferably dialkyltin salts of aliphatic monocarboxylic acids such as lauric acid or of dicarboxylic acids such as maleic acid and phthalic acid. Specific examples thereof include dibutyltin dilaurate, dioctyltin laurate, dibutyltin maleate, dibutyltin phthalate, dimethyltin bis(2-ethylhexylthioglycolate), and alkyltin mercaptides such as dibutyltin mercaptide and dimethyltin mercaptide. Preferred among these are butylrin mercaptan compounds such as dibutyltin mercaptide.

Examples of the calcium alkylcarboxylate include calcium salts of pentanoic acid, hexanoic acid, heptanoic acid, octanoic acid, cyclohexylpropionic acid, nonanoic acid, decanoic acid, lauric acid, myristic acid, palmitic acid, stearic acid, 12-hydroxystearic acid, arachidic acid, behenic acid, lignoceric acid, montanic acid, or the like. Preferred among these is a C8-C28 calcium alkylcarboxylate.

Examples of the zinc compound include an inorganic zinc compound and an organic zinc compound. Examples of the inorganic zinc compound include compounds in the system of zinc carbonate, zinc chloride, zinc sulfate, zinc oxide, zinc hydroxide, basic zinc oxide, and mixed zinc oxide.

In the chlorinated polyvinyl chloride resin composition of the present invention, the amount of the thermal stabilizer is preferably 0.3 to 10 parts by mass, more preferably 0.5 to 7 parts by mass, still more preferably 0.6 to 4 parts by mass based on 100 parts by mass of the chlorinated polyvinyl chloride resin. Containing the thermal stabilizer within this range, the chlorinated polyvinyl chloride resin composition has still higher thermal stability, while maintaining a favorable appearance of the resulting molded article.

The chlorinated polyvinyl chloride resin composition of the present invention preferably further contains a stabilization aid. Containing the stabilization aid, the chlorinated polyvinyl chloride resin composition has still higher thermal stability.

A stabilization aid containing no heavy metal is usable. Examples thereof include organic acid salts, epoxy compounds, phosphoric acid compounds, metal hydroxides, sodium adipates, glycidyl (meth)acrylate copolymers, oxetanyl compounds, vinyl ether compounds, and zeolite compounds.

Examples of the epoxy compounds include epoxidized soybean oil, epoxidized linseed oil, epoxidized tetrahydrophthalate, epoxidized polybutadiene, and bisphenol A-type epoxy compounds.

Examples of the phosphoric acid compounds include organopohosphorus compounds, phosphorous acid esters, and phosphoric acid esters.

Examples of the metal hydroxides include calcium hydroxide and sodium hydroxide.

These stabilization aids may be used singly or in combinations of two or more. The stabilization aid herein is different from a thermal stabilizer.

The stabilization aid preferably has a loss on heating at 200° C. of less than 5% by mass.

The chlorinated polyvinyl chloride resin composition of the present invention contains at least one thioglycolic acid compound selected from the group consisting of thioglycolic acid and thioglycolic acid esters.

The chlorinated polyvinyl chloride resin composition containing at least one thioglycolic acid compound generates less hydrogen chloride during molding thereof, which reduces or prevents corrosion of the inside of a molding machine or a die. In addition, the resulting molded article is less likely to be discolored over time and has excellent mechanical strength.

The thioglycolic acid encompasses not only thioglycolic acid but also thioglycolic acid salts such as metal salts, ammonium salts, and amine salts of thioglycolic acid.

Examples of the thioglycolic acid salts include sodium thioglycolate, calcium thioglycolate, ammonium thioglycolate, methylamine thioglycolate, ethylamine thioglycolate, monoethanolamine thioglycolate, diethanolamine thioglycolate, and triethanolamine thioglycolate.

Examples of the thioglycolic acid esters include thioglycolic acid alkyl esters such as methyl thioglycolate, ethyl thioglycolate, n-butyl thioglycolate, t-butyl thioglycolate, 2-ethylhexyl thioglycolate, octyl thioglycolate, isooctyl thioglycolate, decyl thioglycolate, and dodecyl thioglycolate. Preferred is a thioglycolic acid alkyl ester in which an ester residue has a branched structure.

Also usable is an ester of thioglycolic acid with a hydrocarbon containing an alkoxy group, such as methoxybutyl thioglycolate.

In the case where the thioglycolic acid ester is a thioglycolic acid alkyl ester or an ester of thioglycolic acid with a hydrocarbon containing an alkoxy group, an ester residue preferably has a carbon number of 1 to 8.

Examples of the thioglycolic acid esters further include an alkanediol dithioglycolate which is a thioglycolic acid ester of an alkanediol, an alkanepolyol polythioglycolate which is a thioglycolic acid ester of an alkanepolyol, and polyalkylene glycol dithioglycolate which is a thioglycolic acid ester of polyalkylene glycol.

Examples of the alkanediol dithioglycolate include ethylene glycol bisthioglycolate, butanediol bisthioglycolate, neopentylglycol bisthioglycolate, and hexanediol bisthioglycolate.

Examples of the alkanepolyol polythioglycolate include trimethylolpropane tris(thioglycolate), pentaerythritol tris(thioglycolate), pentaerythritol tetrakis(thioglycolate), and dipentaerythritol hexa(thioglycolate).

Examples of the polyalkylene glycol dithioglycolate include diethylene glycol dithioglycolate.

The thioglycolic acid compound is preferably a compound represented by $HSCH_2COOR$ (wherein R is H or an alkyl group). Moreover, the alkyl group has a carbon number of preferably 1 to 10, more preferably 1 to 8.

In the chlorinated polyvinyl chloride resin composition of the present invention, the lower limit of the amount of the thioglycolic acid compound is preferably 0.001% by mass and the upper limit thereof is preferably 5.0% by mass. Containing the thioglycolic acid compound within this range, the chlorinated polyvinyl chloride resin composition can have still higher discoloration resistance and corrosion resistance. When the amount is not more than 5.0% by mass, the chlorinated polyvinyl chloride resin composition prepared in the form of powder can show excellent powder fluidity when transferred to a hopper or the like of a molding machine. The upper limit of the amount is more preferably 2.0% by mass, still more preferably 1.0% by mass, particularly preferably 0.6% by mass.

In the chlorinated polyvinyl chloride resin composition of the present invention, the lower limit of the amount of the thioglycolic acid compound is preferably 0.0001 parts by mass and the upper limit thereof is preferably 2.2 parts by mass, based on 100 parts by mass of the chlorinated polyvinyl chloride resin. Containing the thioglycolic acid compound within this range, the chlorinated polyvinyl chloride resin composition can have still higher discoloration resistance and corrosion resistance. The upper limit of the amount is more preferably 1.2 parts by mass, more preferably 0.8 parts by mass.

In the chlorinated polyvinyl chloride resin composition of the present invention, the mass ratio of the amount of the thioglycolic acid compound to the amount of the thermal stabilizer (amount of thioglycolic acid compound/amount of thermal stabilizer) is preferably 0.001 to 10.0. The mass ratio of the amount of the thioglycolic acid compound to the amount of the thermal stabilizer is more preferably 0.005 to 6.0, still more preferably 0.01 to 3.0, further preferably 0.05 to 2.9, particularly preferably 0.1 to 2.8, even more preferably 0.12 to 2.7. When the mass ratio is within this range, not only discoloration resistance and corrosion resistance but also thermal stability can be achieved.

In the chlorinated polyvinyl chloride resin composition of the present invention, the mass equivalent (parts by mass) of the structural unit (b) of the chlorinated polyvinyl chloride resin is preferably 5 parts by mass or more, more preferably 7 parts by mass or more, still more preferably 10 parts by mass or more, while preferably 35 parts by mass or less, more preferably 30 parts by mass or less, still more preferably 25 parts by mass or less.

The mass equivalent of the structural unit (b) of the chlorinated polyvinyl chloride resin means the mass (parts by mass) corresponding to the structural unit (b) based on 100 parts by mass of the chlorinated polyvinyl chloride resin, which can be calculated by multiplying the amount (mol %) of the structural unit (b) by the molar mass of the chlorinated polyvinyl chloride resin.

In the chlorinated polyvinyl chloride resin composition of the present invention, the ratio of the amount (parts by mass) of the thioglycolic acid compound to the mass equivalent (parts by mass) of the structural unit (b) of the chlorinated polyvinyl chloride resin is preferably 0.0001 to 1.5. The ratio is more preferably in a range of 0.01 to 1.2, still more preferably 0.1 to 0.8. When the ratio is within the above range, the discoloration resistance and the corrosion resistance can be improved.

The chlorinated polyvinyl chloride resin composition of the present invention may contain a polyvinyl chloride.

The use of the polyvinyl chloride and the chlorinated polyvinyl chloride resin in combination can impart sufficient thermal stability, and such a chlorinated polyvinyl chloride resin composition is suitably usable in a variety of molding methods.

In the present invention, a polyvinyl chloride refers to a polymer mainly containing the structural unit (a) represented by the formula (1). Specifically, the proportion of the structural unit (a) is preferably 51 to 100 mol %.

The PVC used may be a vinyl chloride homopolymer, or may be a copolymer of a vinyl chloride monomer and a monomer with unsaturated bond(s) that is copolymerizable with the vinyl chloride monomer, a graft copolymer obtained by graft-copolymerizing a vinyl chloride monomer to a polymer, or the like. These polymers may be used singly or in combinations of two or more.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene. Examples of the vinyl esters include vinyl acetate and vinyl propionate. Examples of the vinyl ethers include butyl vinyl ether and cetyl vinyl ether.

Examples of the (meth)acrylates include methyl (meth)acrylate, ethyl (meth)acrylate, butyl acrylate, and phenyl methacrylate. Examples of the aromatic vinyls include styrene and α-methyl styrene.

Examples of the vinyl halides include vinylidene chloride and vinylidene fluoride. Examples of the N-substituted maleimides include N-phenyl maleimide and N-cyclohexyl maleimide.

Preferred among these are ethylene and vinyl acetate.

The polymer to which vinyl chloride is graft copolymerized is not limited as long as vinyl chloride can be graft copolymerized. Examples of such a polymer include an ethylene-vinyl acetate copolymer, an ethylene-vinyl acetate-carbon monoxide copolymer, an ethylene-ethyl acrylate copolymer, an ethylene-butyl acrylate-carbon monoxide copolymer, an ethylene-methyl methacrylate copolymer, and an ethylene-propylene copolymer. Examples also include an acrylonitrile-butadiene copolymer, polyurethane, chlorinated polyethylene, and chlorinated polypropylene. These may be used singly or in combination of two or more.

The method of polymerizing the PVC is not limited, and a conventionally known method such as aqueous suspension polymerization, bulk polymerization, solution polymerization, or emulsion polymerization can be used.

The PVC has a chlorine content of lower than 56.8% by mass.

When the chlorine content is within the above range, the chlorinated polyvinyl chloride resin composition has better moldability and the resulting molded article has higher heat distortion resistance. The chlorine content is preferably 36.8 to 56.7% by mass.

The PVC has a degree of polymerization of 400 to 1,000. When the degree of polymerization is within the above range, the chlorinated polyvinyl chloride resin composition as a product is satisfactory in both fluidity and product strength. The lower limit of the degree of polymerization of the PVC is preferably 500 and the upper limit thereof is preferably 800.

The difference in the degree of polymerization between the chlorinated polyvinyl chloride resin and the polyvinyl chloride is preferably 500 or less. When the difference in the degree of polymerization is within the above range, the chlorinated polyvinyl chloride resin composition as a product is satisfactory in both fluidity and product strength. The difference is more preferably 300 or less.

In the chlorinated polyvinyl chloride resin composition of the present invention, the lower limit of the amount of the polyvinyl chloride is 1 part by mass and the upper limit thereof is 30 parts by mass based on 100 parts by mass of the chlorinated polyvinyl chloride resin.

Addition of the polyvinyl chloride within this range further improves thermal stability, while maintaining favorable appearance of the resulting molded article.

The lower limit of the amount of the polyvinyl chloride is more preferably 5 parts by mass and the upper limit thereof is more preferably 20 parts by mass.

The amount of the polyvinyl chloride in the entire chlorinated polyvinyl chloride resin composition of the present invention is preferably 2 to 18% by mass.

The chlorinated polyvinyl chloride resin composition of the present invention preferably contains an impact resistance modifier.

The impact resistance modifier is used for the purpose of improving the impact resistance of the resulting molded article. The impact resistance modifier preferably contains a diene rubber component.

The diene rubber component may be a homopolymer or a copolymer (including a binary copolymer and a ternary copolymer). Specifically, a copolymer containing a diene component as a copolymer component is referred to as a diene rubber component. The polymerization method employed may be any of random copolymerization, alternating copolymerization, block copolymerization, and graft copolymerization.

Examples of the diene component include butadiene, isoprene, and chloroprene.

Examples of the diene rubber component include a copolymer containing a monomer component selected from the group consisting of unsaturated nitriles, α-olefins, and aromatic vinyls. The examples further include a copolymer of an unsaturated nitrile and a diene component, a copolymer of an aromatic vinyl and a diene component, a copolymer of an olefin and a diene component, and a copolymer of a (meth)acrylate monomer component and a diene component.

More specific examples of the diene rubber component include an acrylonitrile-butadiene copolymer, a butadiene-styrene copolymer, a styrene-isoprene copolymer, and an ethylene-propylene-diene copolymer. The diene rubber component used is preferably a methyl methacrylate-butadiene-styrene copolymer (MBS), an acrylonitrile-butadiene-styrene copolymer (ABS), a methyl methacrylate-acrylonitrile-butadiene-styrene copolymer (MABS), a methyl methacrylate-butadiene copolymer (MB), or the like.

The diene rubber component used is preferably a methyl methacrylate-acrylate butadiene rubber copolymer or a methyl methacrylate-acrylate butadiene rubber-styrene copolymer. Among these, preferred is/are a methyl methacrylate-butadiene-styrene copolymer and/or an acrylonitrile-butadiene-styrene copolymer.

In the case where the diene rubber component is a diene component-containing copolymer, the amount of the diene component is preferably 30 to 90% by mass, more preferably 40 to 85% by mass, still more preferably 50 to 80% by mass.

In the case where the diene rubber component is a copolymer of an acrylic component and a diene component, the ratio of the acrylic component to the diene component (acrylic component/diene component) is within a range of preferably 0.05 to 3.0, more preferably 0.1 to 2.5, still more preferably 0.1 to 2.0.

The impact resistance modifier may contain a non-diene component.

Examples of the non-diene component include a polymer containing one or more monomer components selected from the group consisting of olefins and organosiloxanes. More specific examples thereof include olefin rubbers (e.g., ethylene-propylene rubber) and silicone acrylic rubbers.

Examples of the non-diene component include a (meth)acrylate monomer component.

Examples of the (meth)acrylate monomer component include C1-C12 alkyl (meth)acrylates, such as methyl (meth)acrylate, ethyl (meth)acrylate, propyl (meth)acrylate, butyl (meth)acrylate, 2-ethyl (meth)acrylate, and 2-ethylhexyl methacrylate. These monomer components may be used singly or in combinations of two or more (e.g., three monomer components). The examples further include a methyl methacrylate-(acrylic silicone complex) copolymer.

The amount of the (meth)acrylate monomer component in the polymer constituting the diene rubber particles is not limited, and is preferably 25% by mass or more, for example.

The impact resistance modifier is preferably in the form of particles, which can improve the dispersibility of the impact resistance modifier in the chlorinated polyvinyl chloride resin composition containing CPVC.

The lower limit of the average particle size of the impact resistance modifier is preferably 0.001 μm and the upper limit thereof is preferably 1.0 μm. When the average particle size is within the above range, transparency and impact resistance can be both achieved. The average particle size can be measured using a laser diffraction particle size distribution analyzer.

The lower limit of the specific gravity of the impact resistance modifier is preferably 0.92 g/cm$^3$ and the upper limit thereof is preferably 1.16 g/cm$^3$. When the specific gravity is within the above range, the particles of the impact resistance modifier can improve impact resistance without impairing transparency of the resulting molded article. The specific gravity can be measured, for example, with a dry automatic pycnometer (Accupyc 111340, available from Shimadzu Corporation).

In the chlorinated polyvinyl chloride resin composition of the present invention, the amount of the impact resistance modifier is 1.0 to 20 parts by mass based on 100 parts by mass of the chlorinated polyvinyl chloride resin. The chlorinated polyvinyl chloride resin composition containing the impact resistance modifier within this range can provide a molded article having still higher impact resistance.

The lower limit of the amount of the impact resistance modifier is more preferably 3.0 parts by mass and the upper limit thereof is more preferably 18.0 parts by mass.

The chlorinated polyvinyl chloride resin composition of the present invention preferably further contains an antioxidant.

The antioxidant used may be, for example, a phenolic antioxidant, a phosphoric acid antioxidant, a sulfur antioxidant, or an amine antioxidant. These antioxidants may be used singly or in combinations of two or more.

Among these, preferred is a phenolic antioxidant and particularly preferred is a hindered phenol antioxidant.

Examples of the hindered phenol antioxidant include 2,6-di-t-butyl-p-cresol, 2,6-diphenyl-4-octadecyloxyphenol, stearyl(3,5-t-butyl-4-hydroxyphenyl)propionate, distearyl (3,5-t-butyl-4-hydroxybenzyl)phosphonate, 2,2'-methylenebis(4-methyl-6-t-butylphenol), 2,2'-methylenebis(4-ethyl-6-t-butylphenol), bis[3,3-bis(4-hydroxy-3-t-butylphenyl) butyric acid] glycol ester, 4,4'-butylidenebis(6-t-butyl-m-cresol), 2,2'-ethylidenebis(4,6-di-t-butylphenol), 2,2'-ethylidenebis(4-sec-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, pentaerythrityl-tetrakis[methylene-3-(3,5-di-t-butyl-4-hydroxyphenyl)propionate], 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5]undecane, and bis[β-(3-t-butyl-4-hydroxy-5-methylphenyl)propionate]. Among these, preferred are 1,3,5-tris(3,5-di-t-butyl-4-hydroxybenzyl)isocyanurate and pentaerythrityl-tetrakis[methylene-3-(3,5-di-t-butyl-4-hydroxyphenyl)propionate]. These may be used singly or in combinations of two or more.

The antioxidant preferably has a loss on heating at 200° C. of less than 5% by mass.

When the loss on heating at 200° C. is 5% by mass or more, the resulting molded article may contain bubbles therein to have insufficient strength or have a streak-like pattern at around the surface to have a defective appearance.

The loss on heating at 200° C. is more preferably less than 3% by mass.

In the chlorinated polyvinyl chloride resin composition of the present invention, the amount of the antioxidant is preferably 0.1 to 3 parts by mass, more preferably within a range of 0.2 to 2.5 parts by mass based on 100 parts by mass of the chlorinated polyvinyl chloride resin. Containing the antioxidant within this range, the chlorinated polyvinyl chloride resin composition can provide a molded article less susceptible to discoloration due to yellowing.

The chlorinated polyvinyl chloride resin composition of the present invention preferably contains a lubricant.

Examples of the lubricant include internal lubricants and external lubricants. The internal lubricants are used to reduce the fluid viscosity of the molten resin in molding to prevent the generation of frictional heat. The external lubricants are used to improve the slip effect between metal surfaces and the molten resin in molding.

The lubricant is not limited, and examples thereof include paraffin waxes, aliphatic hydrocarbon lubricants, polyolefin waxes, higher aliphatic alcohol lubricants, higher fatty acid lubricants, fatty acid ester lubricants, fatty acid amide lubricants, silicon resin lubricants, fluororesin lubricants, silicone oil, phosphoric acid alcohol esters, and carnauba wax.

Examples of the paraffin waxes include liquid paraffin containing 16 or more carbon atoms and partial oxides thereof, and native/synthetic paraffins.

Examples of the polyolefin waxes include polyethylene wax, polyethylene oxide wax, and polypropylene wax.

Examples of the higher aliphatic alcohol include lauryl alcohol and stearyl alcohol.

The higher fatty acid lubricants are preferably higher fatty acids containing 16 or more carbon atoms, and examples thereof include stearic acid and montanic acid. The examples further include purified substances of plant oils such as coconut oil, soybean oil, and rapeseed oil. Partially saponified esters of higher fatty acids (e.g., stearic acid, montanic acid) are also suitably usable.

Examples of the fatty acid ester lubricants include 2,3-dihydroxypropyl octadecanoate, butyl stearate, glycerol monostearate, pentaerythritol fatty acid esters such as pentaerythritol tetrastearate, and dipentaerythritol fatty acid esters.

These may be used singly or in combinations of two or more.

In the chlorinated polyvinyl chloride resin composition of the present invention, the amount of the lubricant is preferably 0.3 to 5.0 parts by mass based on 100 parts by mass of the chlorinated polyvinyl chloride resin. Containing the lubricant within this range, the chlorinated polyvinyl chloride resin composition is not likely to have scorch marks or foam during molding to provide a molded article excellent in surface smoothness.

The chlorinated polyvinyl chloride resin composition of the present invention may optionally contain additives such as processing aids, heat resistance improvers, ultraviolet absorbers, light stabilizers, fillers, thermoplastic elastomers, and pigments.

Examples of the heat resistance improvers include, but are not limited to, α-methylstyrene resins and N-phenylmaleimide resins.

Examples of the light stabilizers include, but are not limited to, hindered amine light stabilizers.

The processing aid used preferably contains an acrylic resin having a weight average molecular weight of 50,000 to 10,000,000.

Examples of the acrylic resin include homopolymers of acrylic acid, methacrylic acid, and (meth)acrylic acid esters, and (meth)acrylic copolymers containing these.

Examples of the (meth)acrylic acid esters include methyl (meth)acrylate, ethyl (meth)acrylate, isopropyl (meth)acrylate, n-butyl (meth)acrylate, and isobutyl (meth)acrylate. Examples of the (meth)acrylic acid esters also include n-amyl (meth)acrylate, isoamyl (meth)acrylate, n-hexyl (meth)acrylate, 2-ethylhexyl (meth)acrylate, and n-octyl (meth)acrylate. Here, the term "(meth)acrylic acid" refers to acrylic acid or methacrylic acid. In the present invention, the acrylic processing aid used is preferably a polymer of methyl (meth)acrylate (MMA).

Examples of the ultraviolet absorbers include, but are not limited to, salicylate ultraviolet absorbers, benzophenone ultraviolet absorbers, benzotriazole ultraviolet absorbers, and cyanoacrylate ultraviolet absorbers.

Examples of the pigments include, but are not limited to, organic pigments such as azo pigments, phthalocyanine pigments, threne pigments, and dye lake pigments; and inorganic pigments such as oxide pigments (e.g., titanium dioxide), sulfide/selenide pigments, and ferrocyanide pigments.

The chlorinated polyvinyl chloride resin composition of the present invention may contain a plasticizer for the purpose of improving processability in molding. However, since a plasticizer may lower the thermal stability of a resulting molded article, the use of a plasticizer in a large amount is not so preferred. Examples of the plasticizer include, but are not limited to, dibutyl phthalate, di-2-ethylhexyl phthalate, and di-2-ethylhexyl adipate.

The chlorinated polyvinyl chloride resin composition of the present invention may contain a thermoplastic elastomer for the purpose of improving workability. Examples of the thermoplastic elastomer include nitrile thermoplastic elastomers, olefin thermoplastic elastomers, vinyl chloride thermoplastic elastomers, styrene thermoplastic elastomers, urethane thermoplastic elastomers, polyester thermoplastic elastomers, and polyamide thermoplastic elastomers.

Examples of the nitrile thermoplastic elastomers include an acrylonitrile-butadiene copolymer (NBR).

Examples of the olefin thermoplastic elastomers include ethylene thermoplastic elastomers such as an ethylene-vinyl acetate copolymer (EVA) and an ethylene-vinyl acetate-carbon monoxide copolymer (EVACO).

Examples of the vinyl chloride thermoplastic elastomers include a vinyl chloride-vinyl acetate copolymer and a vinyl chloride-vinylidene chloride copolymer.

These thermoplastic elastomers may be used singly or in combinations of two or more.

The chlorinated polyvinyl chloride resin composition of the present invention is produced, for example, by a method including mixing the chlorinated polyvinyl chloride resin with a predetermined thermal stabilizer and a predetermined thioglycolic acid compound and optionally adding additives such as antioxidants, diene rubber particles, and lubricants.

The antioxidants, diene rubber particles, and lubricants may be blended by any method such as hot blending or cold blending.

According to another aspect of the present invention, the present invention also encompasses a chlorinated polyvinyl chloride resin molded article containing: a chlorinated polyvinyl chloride resin; a thermal stabilizer; and at least one thioglycolic acid compound selected from the group consisting of thioglycolic acid and thioglycolic acid esters.

The constituents of the chlorinated polyvinyl chloride resin, the thermal stabilizer, the thioglycolic acid compound, and other components are the same as those described for the chlorinated polyvinyl chloride resin composition.

The chlorinated polyvinyl chloride resin molded article of the present invention may be produced by any conventionally known molding method such as extrusion molding or injection molding.

The chlorinated polyvinyl chloride resin molded article of the present invention shows excellent discoloration resistance during molding, is not likely to corrode metallic parts such as the inside of a molding machine (cylinder, screw) or a die during molding, and is not likely to cause environmental pollution. The molded article is therefore suitably usable in applications such as plumbing materials and equipment, building components, and housing materials. It is also suitably usable for parts used in aircraft, vehicles, transport vehicles, and the like.

Among these, the molded article is preferably used for pipes and joints, specifically for liquid transport pipes and joints thereof for various applications including water/hot water supply, underfloor heating, hot water heating, hot spring piping, chemical spraying, drainage, water spraying, washing machines, dishwashers, toilets, bathrooms, solar systems, mist generators, and farming.

Advantageous Effects of Invention

The present invention can provide a chlorinated polyvinyl chloride resin composition capable of producing a molded article that has excellent discoloration resistance and corrosion resistance and is not likely to cause environmental pollution as the amount of metal leached therefrom is small, and a chlorinated polyvinyl chloride resin molded article.

DESCRIPTION OF EMBODIMENTS

The present invention is more specifically described in the following with reference to, but not limited to, examples.

Example 1

(Preparation of Chlorinated Polyvinyl Chloride Resin Composition)

To 100 parts by mass of a chlorinated polyvinyl chloride resin [degree of chlorination: 67.2% by mass, amount of added chlorine: 10.4% by mass, degree of polymerization: 1,000] was added 0.6 parts by mass of a butyltin mercaptan compound (TVS #1380, available from Nitto Kasei Co., Ltd., dibutyltin mercaptide) as a thermal stabilizer. Further, 0.5 parts by mass of 2-ethylhexyl thioglycolate (available from Fujifilm Wako Pure Chemical Corporation) and 0.5 parts by mass of a partially saponified ester of montanic acid (LICOWAX OP, available from Clariant Japan) as a lubricant were added, followed by uniform mixing using a super mixer. Thus, a chlorinated polyvinyl chloride resin composition was obtained.

The amount (mol %) of the structural unit (b) and the mass equivalent (parts by mass) of the structural unit (b) of the obtained chlorinated polyvinyl chloride resin were determined by FT-NMR using JEOLJNM-AL-300. The NMR analysis can be performed by the method specified in R. A. Komoroski, R. G. Parker, J. P. Shocker, Macromolecules, 1985, 18, 1257-1265.

(Production of Chlorinated Polyvinyl Chloride Resin Molded Article)

The obtained chlorinated polyvinyl chloride resin composition was supplied to a conical counter-rotating twin screw extruder (SLM-50, available from Osada Seisakusho) with a diameter of 50 mm, and a sheet-shaped chlorinated polyvinyl chloride resin molded article was produced at a resin temperature of 210° C. and extrusion amount of 30 kg/hr using a die having a thickness of 2 mm and a width of 80 mm.

Example 2

A chlorinated polyvinyl chloride resin composition and a chlorinated polyvinyl chloride resin molded article were produced as in Example 1, except that the amount of 2-ethylhexyl thioglycolate (available from Fujifilm Wako Pure Chemical Corporation) added was changed to 5 parts by mass.

Examples 3 to 8

A chlorinated polyvinyl chloride resin composition and a chlorinated polyvinyl chloride resin molded article were produced as in Example 1, except that the chlorinated polyvinyl chloride resin used had a degree of polymerization, amount of added chlorine, and a structural unit (b) content as shown in Table 1.

Examples 9 and 10

A chlorinated polyvinyl chloride resin composition and a chlorinated polyvinyl chloride resin molded article were produced as in Example 1, except that the amount of the butyltin mercaptan compound (TVS #1380, available from Nitto Kasei Co., Ltd.) added was changed as shown in Table 1.

Examples 11 and 12

A chlorinated polyvinyl chloride resin composition and a chlorinated polyvinyl chloride resin molded article were produced as in Example 1, except that the butyltin mercaptan compound (TVS #1380, available from Nitto Kasei Co., Ltd.) was replaced by a thermal stabilizer of the type and in an amount as shown in Table 2.

The "Dibutyltin maleate compound" used was "STANN RC-709, available from Nitto Kasei Co., Ltd." and the "Calcium alkylcarboxylate and zinc compound" used was "NT-231, available from Sakai Chemical Industry Co., Ltd".

Examples 13 and 14

A chlorinated polyvinyl chloride resin composition and a chlorinated polyvinyl chloride resin molded article were produced as in Example 1, except that the amount of 2-ethylhexyl thioglycolate (available from Fujifilm Wako Pure Chemical Corporation) was changed as shown in Table 2.

Examples 15 and 16

A chlorinated polyvinyl chloride resin composition and a chlorinated polyvinyl chloride resin molded article were produced as in Example 1, except that 2-ethylhexyl thioglycolate (available from Fujifilm Wako Pure Chemical Corporation) was replaced by a thioglycolic acid compound of the type and in an amount as shown in Table 2.

The "Thioglycolic acid" used was "a product of Fujifilm Wako Pure Chemical Corporation" and the "Methoxybutyl thioglycolate" used was "a product of Tokyo Chemical Industry Co., Ltd."

Examples 17 and 18

A chlorinated polyvinyl chloride resin composition and a chlorinated polyvinyl chloride resin molded article were produced as in Example 1, except that the amount of the partially saponified ester of montanic acid (LICOWAX OP, available from Clariant Japan, dropping point: 96° C. to 102° C., acid value: 9 to 14 mgKOH/g) added was changed as shown in Table 2.

Example 19

A chlorinated polyvinyl chloride resin composition and a chlorinated polyvinyl chloride resin molded article were produced as in Example 1, except that the amounts of the butyltin mercaptan compound (TVS #1380, available from Nitto Kasei Co., Ltd.) and 2-ethylhexyl thioglycolate (available from Fujifilm Wako Pure Chemical Corporation) were changed as shown in Table 2.

Comparative Example 1

A chlorinated polyvinyl chloride resin composition and a chlorinated polyvinyl chloride resin molded article were produced as in Example 1, except that 2-ethylhexyl thioglycolate (available from Fujifilm Wako Pure Chemical Corporation) was not added.

Comparative Example 2

A chlorinated polyvinyl chloride resin composition and a chlorinated polyvinyl chloride resin molded article were produced as in Comparative Example 1, except that the amount of the butyltin mercaptan compound (TVS #1380, available from Nitto Kasei Co., Ltd.) added was changed as shown in Table 2.

<Evaluation>

The following evaluations were performed on the chlorinated polyvinyl chloride resin molded articles obtained in the examples and comparative examples. Tables 1 and 2 show the results.

<Evaluation on Discoloration Resistance>

Each of the obtained chlorinated polyvinyl chloride resin molded articles was put in an oven at 205° C. and allowed to stand still for 90 minutes. The molded article was taken out and checked for discoloration. The checking was repeated every 10 minutes and the time at which discoloration was observed was recorded.

<Evaluation on Amount of Tin Leached>

Each of the obtained chlorinated polyvinyl chloride resin molded articles was immersed in test water (pH 5, 82° C.). Thirty days later, a sample solution was collected and the amount of tin leached was determined using an ICP mass analyzer (Varian 710-ES, available from Varian Inc.). The term "ND" in the tables means a value not more than the detection limit.

<Evaluation on Dehydrochlorination Amount>

An about 0.5-g portion of a measurement sample weighed from each of the obtained chlorinated polyvinyl chloride resin compositions was put into a glass test tube with a plug equipped with two glass tubes. Nitrogen gas was introduced (50 ml/min) into the test tube through one glass tube, and the test tube was heated in an oil bath (oil temperature: 195° C.) equipped with a stirrer. Hydrochloric acid generated in the test tube was brown into distilled water (100 ml) in a beaker through the other glass tube. Twenty minutes later, the pH value of the solution in the beaker was determined to calculate the dehydrochlorination amount based on the pH value.

<Evaluation on Corrosion Resistance>

An about 0.5-g portion of a sample was cut out from each of the obtained chlorinated polyvinyl chloride resin molded articles after 20 minutes of its production, and put in a dedicated glass test tube. A metal piece (1 cm in length×1 cm in width×0.3 cm in thickness) made of carbon steel S45C was enclosed with the sample in the test tube. Air was introduced into the test tube and the test tube was heated in an oil bath (oil temperature: 195° C.). The corrosion state (rust or the like) of the metal piece was checked.

The case where no corrosion was observed was rated ○ (Good), the case where slight corrosion was observed was rated Δ (Fair), and the case where obvious corrosion was observed was rated x (Poor)

TABLE 1

| | | | Example | | | | | |
|---|---|---|---|---|---|---|---|---|
| | | | 1 | 2 | 3 | 4 | 5 | 6 |
| Composition | Chlorinated polyvinyl chloride resin | Degree of polymerization | 1000 | 1000 | 800 | 600 | 1000 | 1000 |
| | | Amount of added chlorine (mass %) | 10.4 | 10.4 | 10.4 | 10.4 | 6.8 | 14.6 |
| | | Structural unit (b) content (mol %) | 20.8 | 20.4 | 20.4 | 20.1 | 15.1 | 24.8 |
| | | Mass equivalent of structural unit (b) (parts by mass) | 17.41 | 17.08 | 15.58 | 18.55 | 12.64 | 20.76 |
| | | Amount (parts by mass) | 100.0 | 100.0 | 100.0 | 100.0 | 100.0 | 100.0 |
| | Thermal stabilizer (parts by mass) | Butyltin mercaptan compound | 0.6 | 0.6 | 0.6 | 0.6 | 0.6 | 0.6 |
| | | Butyltin maleate compound | 0.0 | 0.0 | 0.0 | 0.0 | 0.0 | 0.0 |
| | | Calcium alkylcarboxylate and zinc compound | 0.0 | 0.0 | 0.0 | 0.0 | 0.0 | 0.0 |
| | Thioglycolic acid compound (parts by mass) | 2-Ethylhexyl thioglycolate | 0.5 | 5.0 | 0.5 | 0.5 | 0.5 | 0.5 |
| | | Thioglycolic acid | 0.0 | 0.0 | 0.0 | 0.0 | 0.0 | 0.0 |
| | | Methoxybutyl thioglycolate | 0.0 | 0.0 | 0.0 | 0.0 | 0.0 | 0.0 |
| | Lubricant (parts by mass) | Partially saponified ester of montanic acid | 0.5 | 0.5 | 1.5 | 0.5 | 0.5 | 0.5 |
| | Total (parts by mass) | | 101.6 | 106.1 | 102.6 | 101.6 | 101.6 | 101.6 |
| | Thioglycolic acid compound content relative to the entire composition (mass %) | | 0.49 | 4.71 | 0.49 | 0.49 | 0.49 | 0.49 |

TABLE 1-continued

|  |  |  |  |  |  |  |  |
|---|---|---|---|---|---|---|---|
|  | Mass ratio (thioglycolic acid compound/thermal stabilizer) | 0.83 | 8.33 | 0.83 | 0.83 | 0.83 | 0.83 |
|  | Amount of thioglycolic acid compound relative to mass equivalent of structural unit (b) | 0.029 | 0.293 | 0.032 | 0.027 | 0.040 | 0.024 |
| Evaluation | Corrosion resistance | ○ | ○ | ○ | ○ | ○ | ○ |
|  | Discoloration resistance (min) | 40 | 80 | 40 | 40 | 50 | 30 |
|  | Amount of tin leached (ppb) | 1.4 | 1.4 | 1.8 | 1.9 | 1.7 | 2.6 |
|  | Dehydrochlorination amount (g) | 0.32 | 0.06 | 0.3 | 0.31 | 0.25 | 0.38 |

|  |  |  | Example | | | |
|---|---|---|---|---|---|---|
|  |  |  | 7 | 8 | 9 | 10 |
| Composition | Chlorinated polyvinyl chloride resin | Degree of polymerization | 1000 | 1000 | 1000 | 1000 |
|  |  | Amount of added chlorine (mass %) | 10.4 | 10.4 | 10.4 | 10.4 |
|  |  | Structural unit (b) content (mol %) | 22.1 | 18.4 | 20.8 | 20.8 |
|  |  | Mass equivalent of structural unit (b) (parts by mass) | 18.50 | 15.40 | 17.41 | 17.41 |
|  |  | Amount (parts by mass) | 100.0 | 100.0 | 100.0 | 100.0 |
|  | Thermal stabilizer (parts by mass) | Butyltin mercaptan compound | 0.6 | 0.6 | 1.2 | 3.6 |
|  |  | Butyltin maleate compound | 0.0 | 0.0 | 0.0 | 0.0 |
|  |  | Calcium alkylcarboxylate and zinc compound | 0.0 | 0.0 | 0.0 | 0.0 |
|  | Thioglycolic acid compound (parts by mass) | 2-Ethylhexyl thioglycolate | 0.5 | 0.5 | 0.5 | 0.5 |
|  |  | Thioglycolic acid | 0.0 | 0.0 | 0.0 | 0.0 |
|  |  | Methoxybutyl thioglycolate | 0.0 | 0.0 | 0.0 | 0.0 |
|  | Lubricant (parts by mass) | Partially saponified ester of montanic acid | 0.5 | 0.5 | 0.5 | 0.5 |
|  | Total (parts by mass) |  | 101.6 | 101.6 | 102.2 | 104.6 |
|  | Thioglycolic acid compound content relative to the entire composition (mass %) |  | 0.49 | 0.49 | 0.49 | 0.48 |
|  | Mass ratio (thioglycolic acid compound/thermal stabilizer) |  | 0.83 | 0.83 | 0.42 | 0.14 |
|  | Amount of thioglycolic acid compound relative to mass equivalent of structural unit (b) |  | 0.027 | 0.032 | 0.029 | 0.029 |
| Evaluation | Corrosion resistance |  | ○ | ○ | ○ | ○ |
|  | Discoloration resistance (min) |  | 50 | 30 | 80 | 120 |
|  | Amount of tin leached (ppb) |  | 1.5 | 2.9 | 8.3 | 15.6 |
|  | Dehydrochlorination amount (g) |  | 0.18 | 0.43 | 0.28 | 0.24 |

TABLE 2

|  |  |  | Example | | | | | |
|---|---|---|---|---|---|---|---|---|
|  |  |  | 11 | 12 | 13 | 14 | 15 | 16 |
| Composition | Chlorinated polyvinyl chloride resin | Degree of polymerization | 1000 | 1000 | 1000 | 1000 | 1000 | 1000 |
|  |  | Amount of added chlorine (mass %) | 104 | 10.4 | 104 | 104 | 10.4 | 10.4 |
|  |  | Structural unit (b) content (mol %) | 20.8 | 20.8 | 20.8 | 20.8 | 20.8 | 20.8 |
|  |  | Mass equivalent of structural unit (b) (parts by mass) | 17.41 | 17.41 | 17.41 | 17.41 | 17.41 | 17.41 |
|  |  | Amount (parts by mass) | 100.0 | 100.0 | 100.0 | 100.0 | 100.0 | 100.0 |
|  | Thermal stabilizer (parts by mass) | Butyltin mercaptan compound | 0.0 | 0.0 | 0.6 | 0.6 | 0.6 | 0.6 |
|  |  | Butyltin maleate compound | 0.6 | 0.0 | 0.0 | 0.0 | 0.0 | 0.0 |
|  |  | Calcium alkylcarboxylate and zinc compound | 0.0 | 0.6 | 0.0 | 0.0 | 0.0 | 0.0 |
|  | Thioglycolic acid compound (parts by mass) | 2-Ethylhexyl thioglycolate | 0.5 | 0.5 | 0.015 | 1.6 | 0.0 | 0.0 |
|  |  | Thioglycolic acid | 0.0 | 0.0 | 0.0 | 0.0 | 0.5 | 0.0 |
|  |  | Methoxybutyl thioglycolate | 0.0 | 0.0 | 0.0 | 0.0 | 0.0 | 0.5 |
|  | Lubricant (parts by mass) | Partially saponified ester of montanic acid | 0.5 | 0.5 | 0.5 | 0.5 | 0.5 | 0.5 |
|  | Total (parts by mass) |  | 101.0 | 101.0 | 101.1 | 102.7 | 101.1 | 101.1 |
|  | Thioglycolic acid compound content relative to the entire composition (mass %) |  | 0.50 | 0.50 | 0.015 | 1.56 | 0.49 | 0.49 |
|  | Mass ratio (thioglycolic acid compound/thermal stabilizer) |  | 0.83 | 0.83 | 0.03 | 2.67 | 0.83 | 0.83 |
|  | Amount of thioglycolic acid compound relative to mass equivalent of structural unit (b) |  | 0.029 | 0.029 | 0.001 | 0.092 | 0.029 | 0.029 |
| Evaluation | Corrosion resistance |  | ○ | ○ | ○ | ○ | ○ | ○ |
|  | Discoloration resistance (min) |  | 30 | 30 | 30 | 60 | 30 | 30 |
|  | Amount of tin leached (ppb) |  | 1.4 | ND | 3.2 | 1.4 | 2.4 | 4.4 |
|  | Dehydrochlorination amount (g) |  | 0.45 | 0.31 | 0.48 | 0.18 | 0.57 | 0.44 |

TABLE 2-continued

| | | | Example | | | Comparative Example | |
|---|---|---|---|---|---|---|---|
| | | | 17 | 18 | 19 | 1 | 2 |
| Composition | Chlorinated polyvinyl chloride resin | Degree of polymerization | 1000 | 1000 | 1000 | 1000 | 1000 |
| | | Amount of added chlorine (mass %) | 10.4 | 10.4 | 10.4 | 10.4 | 10.4 |
| | | Structural unit (b) content (mol %) | 20.8 | 20.8 | 20.8 | 20.8 | 20.8 |
| | | Mass equivalent of structural unit (b) (parts by mass) | 17.41 | 17.41 | 17.41 | 17.41 | 17.41 |
| | | Amount (parts by mass) | 100.0 | 100.0 | 100.0 | 100.0 | 100.0 |
| | Thermal stabilizer (parts by mass) | Butyltin mercaptan compound | 0.6 | 0.6 | 0.2 | 0.6 | 4.5 |
| | | Butyltin maleate compound | 0.0 | 0.0 | 0.0 | 0.0 | 0.0 |
| | | Calcium alkylcarboxylate and zinc compound | 0.0 | 0.0 | 0.0 | 0.0 | 0.0 |
| | Thioglycolic acid compound (parts by mass) | 2-Ethylhexyl thioglycolate | 0.5 | 0.5 | 2.4 | 0.0 | 0.0 |
| | | Thioglycolic acid | 0.0 | 0.0 | 0.0 | 0.0 | 0.0 |
| | | Methoxybutyl thioglycolate | 0.0 | 0.0 | 0.0 | 0.0 | 0.0 |
| | Lubricant (parts by mass) | Partially saponified ester of montanic acid | 2.5 | 4.8 | 0.5 | 0.5 | 0.5 |
| | Total (parts by mass) | | 103.6 | 105.9 | 103.1 | 101.1 | 105.0 |
| | Thioglycolic acid compound content relative to the entire composition (mass %) | | 0.48 | 0.47 | 2.33 | 0.0 | 0.0 |
| | Mass ratio (thioglycolic acid compound/thermal stabilizer) | | 0.83 | 0.83 | 12.00 | 0.0 | 0.0 |
| | Amount of thioglycolic acid compound relative to mass equivalent of structural unit (b) | | 0.029 | 0.029 | 0.138 | 0.0 | 0.0 |
| Evaluation | Corrosion resistance | | ○ | ○ | ○ | x | ○ |
| | Discoloration resistance (min) | | 40 | 40 | 30 | 20 | 40 |
| | Amount of tin leached (ppb) | | 1.4 | 1.4 | 1.4 | 1.4 | 120 |
| | Dehydrochlorination amount (g) | | 0.32 | 0.32 | 0.82 | 0.67 | 0.44 |

INDUSTRIAL APPLICABILITY

The present invention can provide a chlorinated polyvinyl chloride resin composition capable of providing a molded article that is excellent in discoloration resistance and corrosion resistance and is not likely to cause environmental pollution as the amount of metal leached therefrom is small, and a chlorinated polyvinyl chloride resin molded article.

The invention claimed is:

1. A chlorinated polyvinyl chloride resin composition comprising:
   a chlorinated polyvinyl chloride resin;
   a thermal stabilizer; and
   at least one thioglycolic acid compound selected from the group consisting of thioglycolic acid and thioglycolic acid esters,
   wherein the chlorinated polyvinyl chloride resin contains structural units (a) to (c) represented by the following formulas (a) to (c),
   [Chem. 1]

$$-CH_2-CHCl- \quad (a)$$

$$-CH_2-CCl_2- \quad (b)$$

$$-CHCl-CHCl- \quad (c)$$

wherein the mass equivalent of the structural unit (b) of the chlorinated polyvinyl chloride resin is 5 to 35 parts by mass based on 100 parts by mass of the chlorinated polyvinyl chloride resin,
   wherein the amount of added chlorine in the chlorinated polyvinyl chloride resin is 9.3 to 12.3% by mass, and
   wherein the ratio of the amount in parts by mass of the thioglycolic acid compound to the mass equivalent of the structural unit (b) of the chlorinated polyvinyl chloride resin is 0.0001 to 1.5.

2. The chlorinated polyvinyl chloride resin composition according to claim 1,
   wherein the thioglycolic acid compound is contained in an amount of 0.001% by mass or more.

3. The chlorinated polyvinyl chloride resin composition according to claim 1,
   wherein a mass ratio of an amount of the thioglycolic acid compound and an amount of the thermal stabilizer (amount of thioglycolic acid compound/amount of thermal stabilizer) is 0.001 to 10.0.

4. The chlorinated polyvinyl chloride resin composition according to claim 1,
   wherein the thioglycolic acid compound includes at least one selected from compounds represented by $HSCH_2COOR$ wherein R is H or an alkyl group.

5. The chlorinated polyvinyl chloride resin composition according to claim 1,
   wherein the thermal stabilizer contains tin.

6. A chlorinated polyvinyl chloride resin molded article comprising:
   a chlorinated polyvinyl chloride resin;
   a thermal stabilizer; and
   at least one thioglycolic acid compound selected from the group consisting of thioglycolic acid and thioglycolic acid esters,
   wherein the chlorinated polyvinyl chloride resin contains structural units (a) to (c) represented by the following formulas (a) to (c),
   [Chem. 1]

$$-CH_2-CHCl- \quad (a)$$

$$-CH_2-CCl_2- \quad (b)$$

$$-CHCl-CHCl- \quad (c)$$

wherein the mass equivalent of the structural unit (b) of the chlorinated polyvinyl chloride resin is 5 to 35 parts by mass based on 100 parts by mass of the chlorinated polyvinyl chloride resin, wherein the amount of added chlorine in the chlorinated polyvinyl chloride resin is 9.3 to 12.3% by mass, and wherein the ratio of the amount in parts by mass of the thioglycolic acid compound to the mass equivalent of the structural unit (b) of the chlorinated polyvinyl chloride resin is 0.0001 to 1.5.

7. The chlorinated polyvinyl chloride resin composition according to claim 2, wherein a mass ratio of an amount of the thioglycolic acid compound and an amount of the thermal stabilizer (amount of thioglycolic acid compound/amount of thermal stabilizer) is 0.001 to 10.0.

8. The chlorinated polyvinyl chloride resin composition according to claim 2, wherein the thioglycolic acid compound includes at least one selected from compounds represented by $HSCH_2COOR$ wherein R is H or an alkyl group.

9. The chlorinated polyvinyl chloride resin composition according to claim 3, wherein the thioglycolic acid compound includes at least one selected from compounds represented by $HSCH_2COOR$ wherein R is H or an alkyl group.

10. The chlorinated polyvinyl chloride resin composition according to claim 7, wherein the thioglycolic acid compound includes at least one selected from compounds represented by $HSCH_2COOR$ wherein R is H or an alkyl group.

11. The chlorinated polyvinyl chloride resin composition according to claim 2, wherein the thermal stabilizer contains tin.

12. The chlorinated polyvinyl chloride resin composition according to claim 3, wherein the thermal stabilizer contains tin.

13. The chlorinated polyvinyl chloride resin composition according to claim 4, wherein the thermal stabilizer contains tin.

14. The chlorinated polyvinyl chloride resin composition according to claim 7, wherein the thermal stabilizer contains tin.

15. The chlorinated polyvinyl chloride resin composition according to claim 8, wherein the thermal stabilizer contains tin.

16. The chlorinated polyvinyl chloride resin composition according to claim 9, wherein the thermal stabilizer contains tin.

17. The chlorinated polyvinyl chloride resin composition according to claim 10, wherein the thermal stabilizer contains tin.

* * * * *